(12) United States Patent
Chen

(10) Patent No.: US 7,037,967 B2
(45) Date of Patent: May 2, 2006

(54) BI-MODAL IONOMERS

(75) Inventor: John C. Chen, Hockessin, DE (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 0 days.

(21) Appl. No.: 10/854,725

(22) Filed: May 26, 2004

(65) Prior Publication Data

US 2004/0220343 A1 Nov. 4, 2004

Related U.S. Application Data

(62) Division of application No. 10/376,969, filed on Feb. 28, 2003, now Pat. No. 6,762,246, which is a division of application No. 09/924,194, filed on Aug. 8, 2001, now Pat. No. 6,562,906.

(60) Provisional application No. 60/279,023, filed on Mar. 27, 2001, and provisional application No. 60/224,668, filed on Aug. 11, 2000.

(51) Int. Cl.
*A63B 37/00* (2006.01)
*A63B 37/04* (2006.01)
*A63B 37/06* (2006.01)
*A63B 37/12* (2006.01)
*A63B 37/14* (2006.01)

(52) U.S. Cl. ............ 524/430; 524/432; 524/500; 524/515; 473/351; 473/371; 473/377; 473/378

(58) Field of Classification Search ............ 524/430, 524/432, 500, 515; 473/351, 371, 377, 378
See application file for complete search history.

(56) References Cited

U.S. PATENT DOCUMENTS

| | | | |
|---|---|---|---|
| 3,651,014 A | 3/1972 | Witslepe | |
| 3,763,109 A | 10/1973 | Witslepe | |
| 3,766,146 A | 10/1973 | Witslepe | |
| 4,264,075 A | 4/1981 | Miller et al. | |
| 4,274,637 A | 6/1981 | Molitor | |
| 4,323,247 A | 4/1982 | Keches et al. | |
| 4,331,786 A | 5/1982 | Foy et al. | |
| 4,337,947 A | 7/1982 | Saito et al. | |
| 4,398,000 A | 8/1983 | Kataoka et al. | |
| 4,526,375 A | 7/1985 | Nakade | |
| 4,567,219 A | 1/1986 | Tominaga et al. | |
| 4,674,751 A | 6/1987 | Molitor et al. | |
| 4,846,910 A | 7/1989 | Brown | |
| 4,884,814 A | 12/1989 | Sullivan | |
| 4,911,451 A | 3/1990 | Sullivan et al. | |
| 4,984,804 A | 1/1991 | Yamada et al. | |
| 4,986,545 A | 1/1991 | Sullivan | |
| 5,000,459 A | 3/1991 | Isaac | |
| 5,068,151 A | 11/1991 | Nakamura | |
| 5,098,105 A | 3/1992 | Sullivan | |
| 5,120,791 A | 6/1992 | Sullivan | |
| 5,155,157 A | 10/1992 | Statz et al. | |
| 5,197,740 A | 3/1993 | Pocklington et al. | |
| 5,222,739 A | 6/1993 | Horiuchi et al. | |
| 5,253,871 A | 10/1993 | Viollaz | |
| 5,298,571 A | 3/1994 | Statz et al. | |
| 5,321,089 A | 6/1994 | Cadomiga et al. | |
| 5,328,959 A | 7/1994 | Sullivan | |
| 5,330,837 A | 7/1994 | Sullivan | |
| 5,338,038 A | 8/1994 | Cadorniga | |
| 5,338,610 A | 8/1994 | Sullivan | |
| 5,359,000 A | 10/1994 | Hamada et al. | |
| 5,368,304 A | 11/1994 | Sullivan et al. | |
| 5,567,772 A | 10/1996 | Hagman et al. | |
| 5,587,430 A | 12/1996 | Talkowski | |
| 5,688,869 A | 11/1997 | Sullivan | |
| 5,757,483 A | 5/1998 | Pierce, III | |
| 5,810,678 A | 9/1998 | Cavallaro et al. | |
| 5,873,796 A | 2/1999 | Cavallaro et al. | |
| 5,971,870 A | 10/1999 | Sullivan et al. | |
| 5,971,871 A | 10/1999 | Sullivan et al. | |
| 5,971,872 A | 10/1999 | Sullivan et al. | |
| 5,973,046 A | * 10/1999 | Chen et al. ............ | 524/300 |
| 5,976,443 A | 11/1999 | Nesbitt et al. | |
| 6,018,003 A | 1/2000 | Sullivan et al. | |
| 6,096,830 A | 8/2000 | Takemura et al. | |
| 6,100,321 A | * 8/2000 | Chen ..................... | 524/400 |

FOREIGN PATENT DOCUMENTS

| | | |
|---|---|---|
| WO | WO99/48569 | 9/1999 |
| WO | WO 00/23519 | 4/2000 |

OTHER PUBLICATIONS

PCT International Search Report for International application No. PCT/US01/25285, dated Dec. 19, 2001.

* cited by examiner

*Primary Examiner*—Nathan M. Nutter
(74) *Attorney, Agent, or Firm*—Craig H. Evans

(57) ABSTRACT

The present invention relates to compositions and preparative process of partially or fully neutralized mixtures of carboxylate functionalized ethylene high copolymers or terpolymers (Mw between 80,000 and 500,000) with carboxylate functionalized ethylene low copolymers (Mw between 2,000 and 30,000) and organic acid salts and injection or compression molded applications such as golf ball components thereof.

7 Claims, 9 Drawing Sheets

BI-MODAL IONOMERS

CROSS-REFERENCE TO RELATED APPLICATIONS

This application is a divisional application of U.S. application Ser. No. 10/376,969, filed on Feb. 28, 2003, now U.S. Pat. No. 6,762,246, which in turn is a divisional application of U.S. application Ser. No. 09/924,194, filed on Aug. 8, 2001, now issued as U.S. Pat. No. 6,562,906, which in turn claims priority under 35 U.S.C. § 119(e) to U.S. Provisional Appln. No. 60/224,668, filed on Aug. 11, 2000, and to U.S. Provisional Appln. No. 60/279,023, filed on Mar. 27, 2001. Each of the above identified applications is incorporated by reference herein.

BACKGROUND OF THE INVENTION

1. Field of the Invention

The present invention relates to partially or fully neutralized mixtures of carboxylate functionalized ethylene copolymers or terpolymers (Mw between 80,000 and 500,000) with carboxylate functionalized ethylene low copolymers (Mw between 2,000 and 30,000). It also relates to the use of such ionomeric compositions in injection or compression molded applications such as golf ball components.

2. Description of Related Art

There is a need for highly resilient thermoplastic compositions that have good processibility without loss of properties or improved properties (improved resilience and lower stiffness) without loss of processibility.

There is a need in the golf ball art for balls that have a high resilience at high speed impact such as when struck by a driver and lower resilience at low speed impact such as when struck with a putter. High resilience at high speed impact would allow longer driving distance while lower resilience at low speed would provide better putting control.

BRIEF SUMMARY OF THE INVENTION

The highly resilient thermoplastic compositions of this invention provide improved balance of properties and processibility. Also, based on testing of spheres, they appear to be useful as compositions in golf ball applications, particularly as cover and/or intermediate layer material or as core and/or center material or as a one-piece ball, to achieve high resilience at high impact speed and relatively lower resilience at lower impact speed.

The thermoplastic compositions are partially or fully neutralized "bi-modal blends" of high copolymers/low copolymers. That is to say, they are melt-blends of ethylene $\alpha,\beta$ ethylenically unsaturated $C_{3-8}$ carboxylic acid copolymers having weight average molecular weights (Mw) of about 80,000 to about 500,000 (high copolymers) with ethylene $\alpha,\beta$ ethylenically unsaturated $C_{3-8}$ carboxylic acid low copolymers having Mw of about 2,000 to about 30,000 (low copolymers). The high copolymers may be blends of high copolymers and the low copolymers may be blends of low copolymers.

It has been found that, by proper selection of the low copolymer (AC540 has been found to be particularly useful), the thermoplastic compositions of this invention have demonstrated both enhanced melt processability and enhanced heat stability. This combination of the property enhancements is contrasted to the reduction in heat stability that would be expected with higher melt flows. These unique bi-modal ionomer compositions are highly useful to the injection molding applications, including golf ball, foot wear, etc.

Further, with this proper selection of the low copolymer, the thermoplastic compositions of this invention are expected to have enhanced abrasion and scuff resistance. This property enhancement, together with the other property improvements described above, would be highly useful to injection molding, films applications, including golf ball, packaging films, flooring, protective coating, etc.

Preferably the weight percent high copolymer is about 50 to about 95 wt. % and the weight percent low copolymer is about 5 to about 50% based on the total weight of the high copolymer and the low copolymer. Preferably about 40 to 100%, alternatively about 50 to about 85%, of the acid moieties are neutralized by alkali metal or alkyline earth metal cations.

Optionally, the composition may contain up to 100 parts by weight of organic acid salts, up to 200 parts by weight thermoplastic elastomers, up to 170 parts by weight fillers based on 100 parts by weight of the "bi-modal" ionomer of high copolymer/low copolymer be blend.

The compositions described above or their blends could be applied in broad end-uses applications, including injection molding applications, golf ball applications, etc. More specifically the compositions described above are most suited for golf ball applications such as the cover, intermediate layers, core, and center of 2- or multiple-piece balls, and as thermoplastic 1-piece balls.

DETAILED DESCRIPTION

Figure 1:
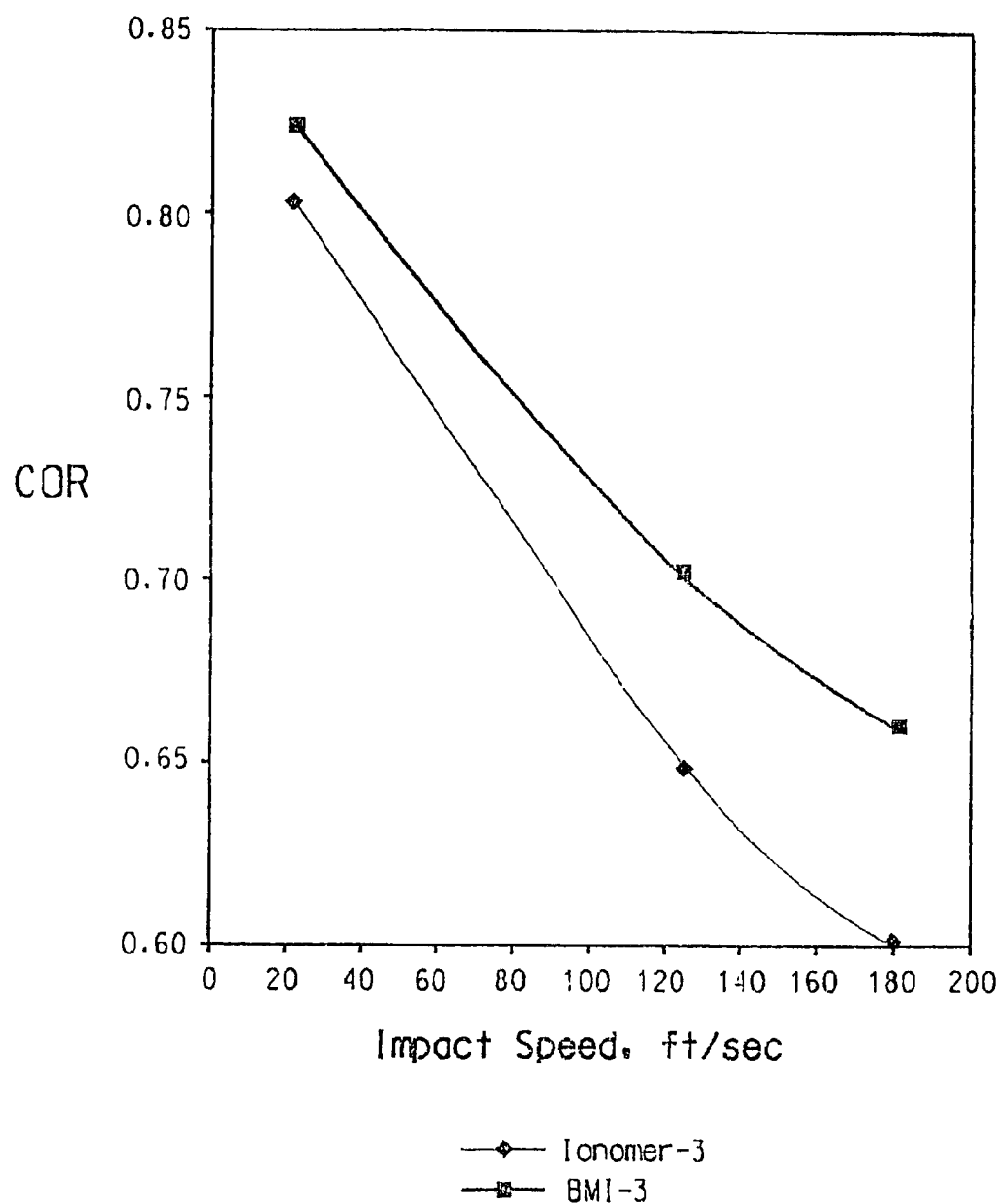
FIGS. 1 through 6 are plots of coefficient of restitution versus impact speed for the individual bi-modal ionomers and the base ionomers used in Examples 23 through 28, respectively.
Figure 2:
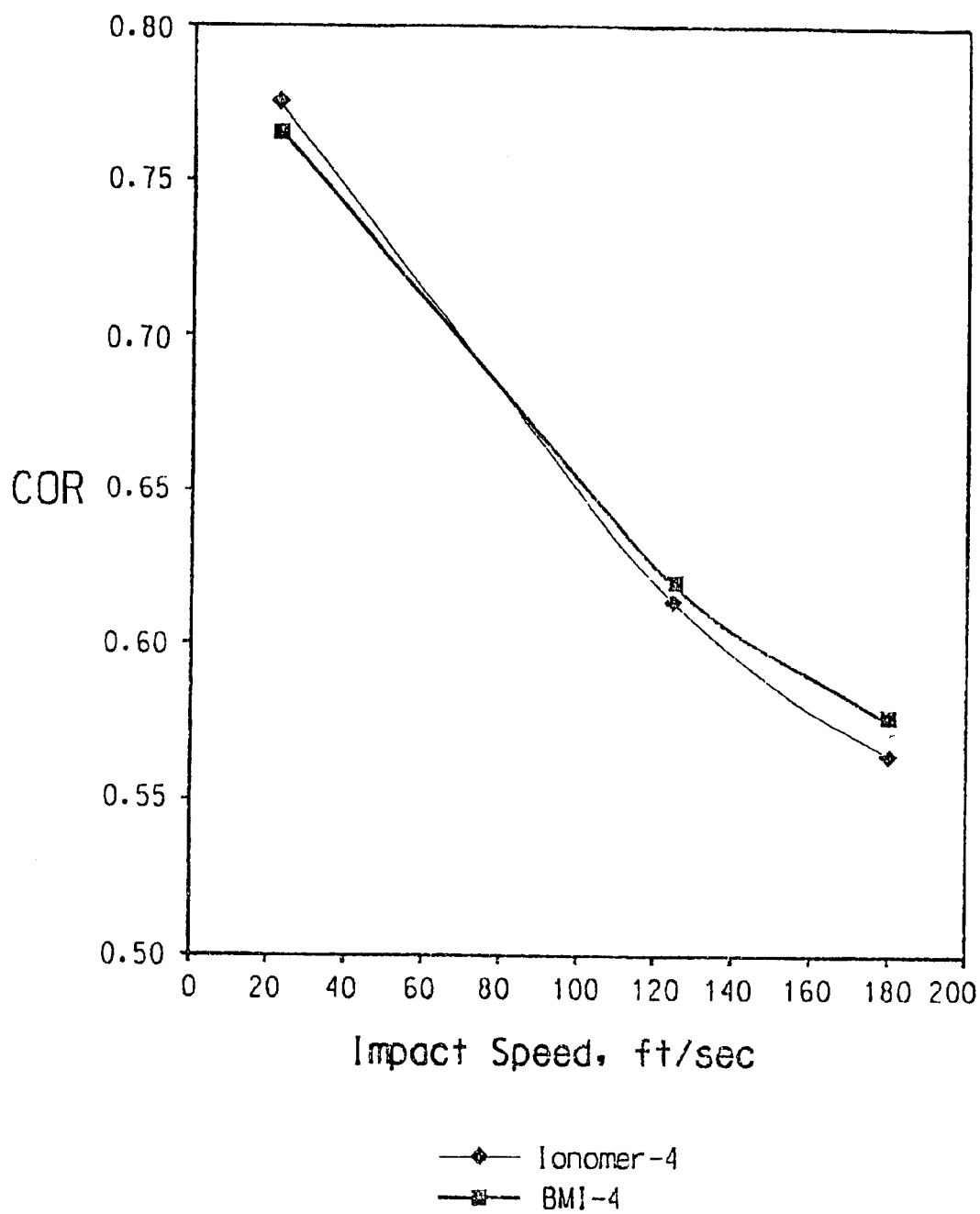
Figure 3:
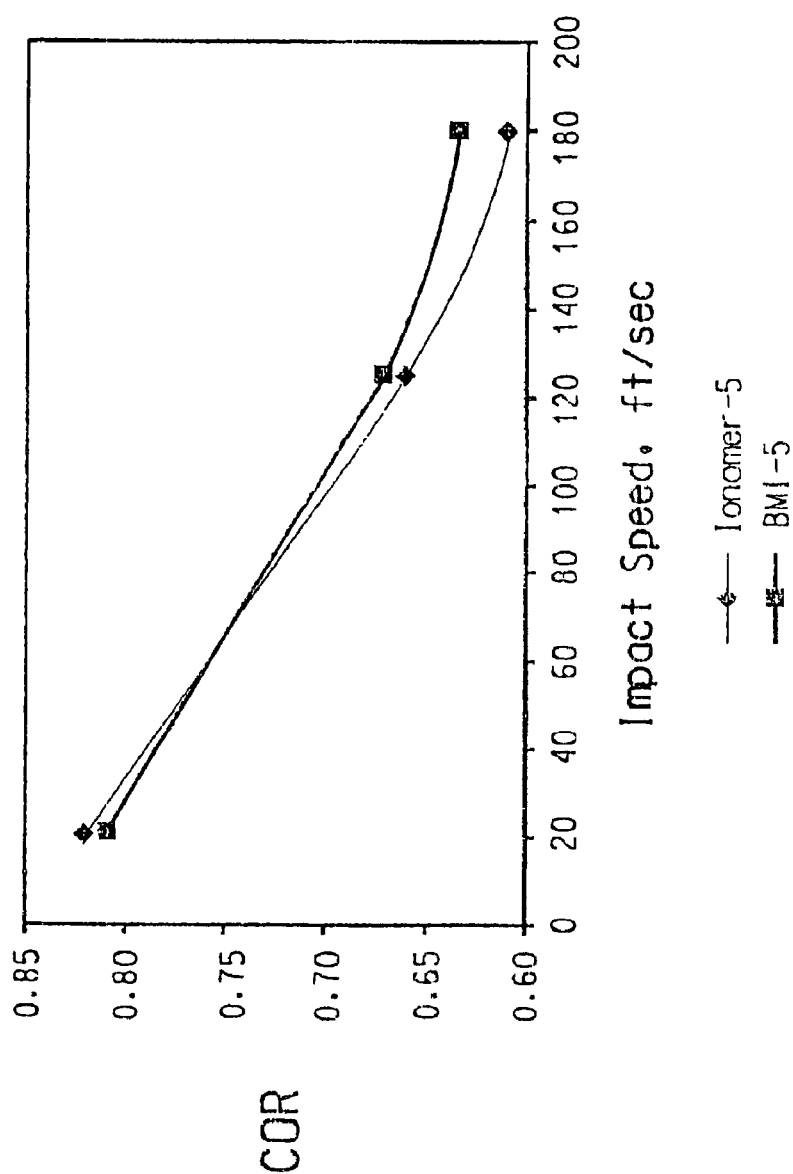
Figure 4:
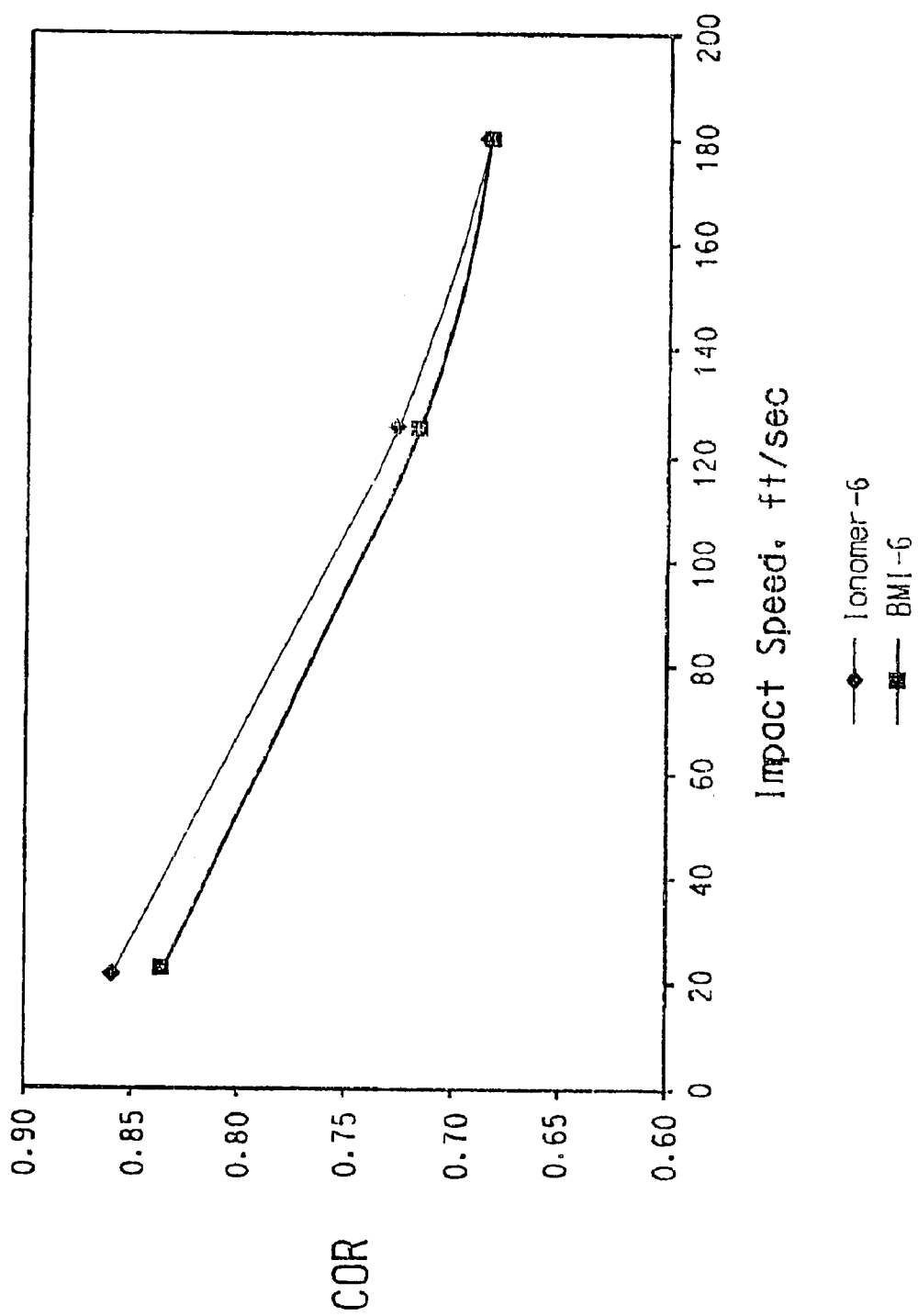
Figure 5:
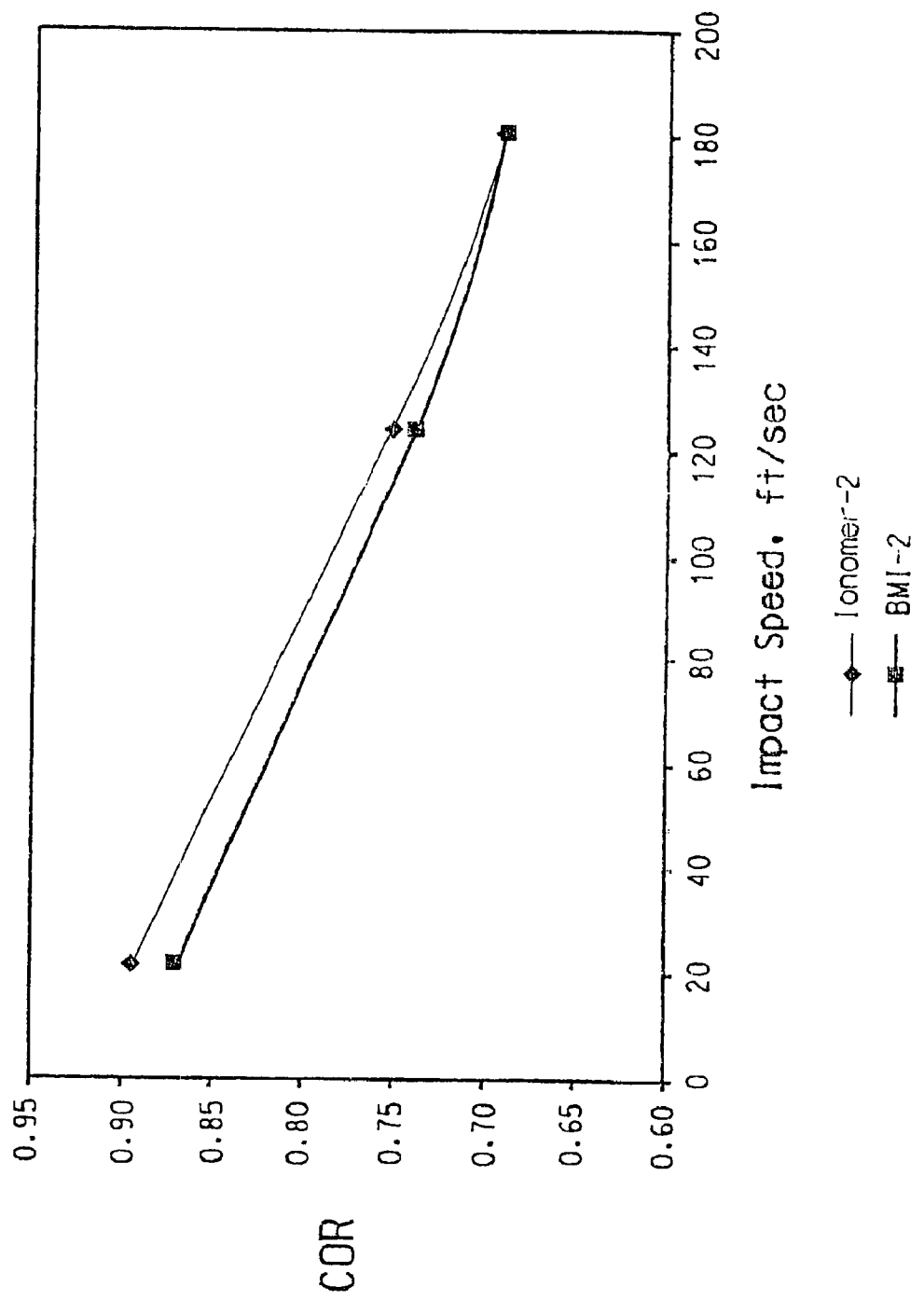
Figure 6:
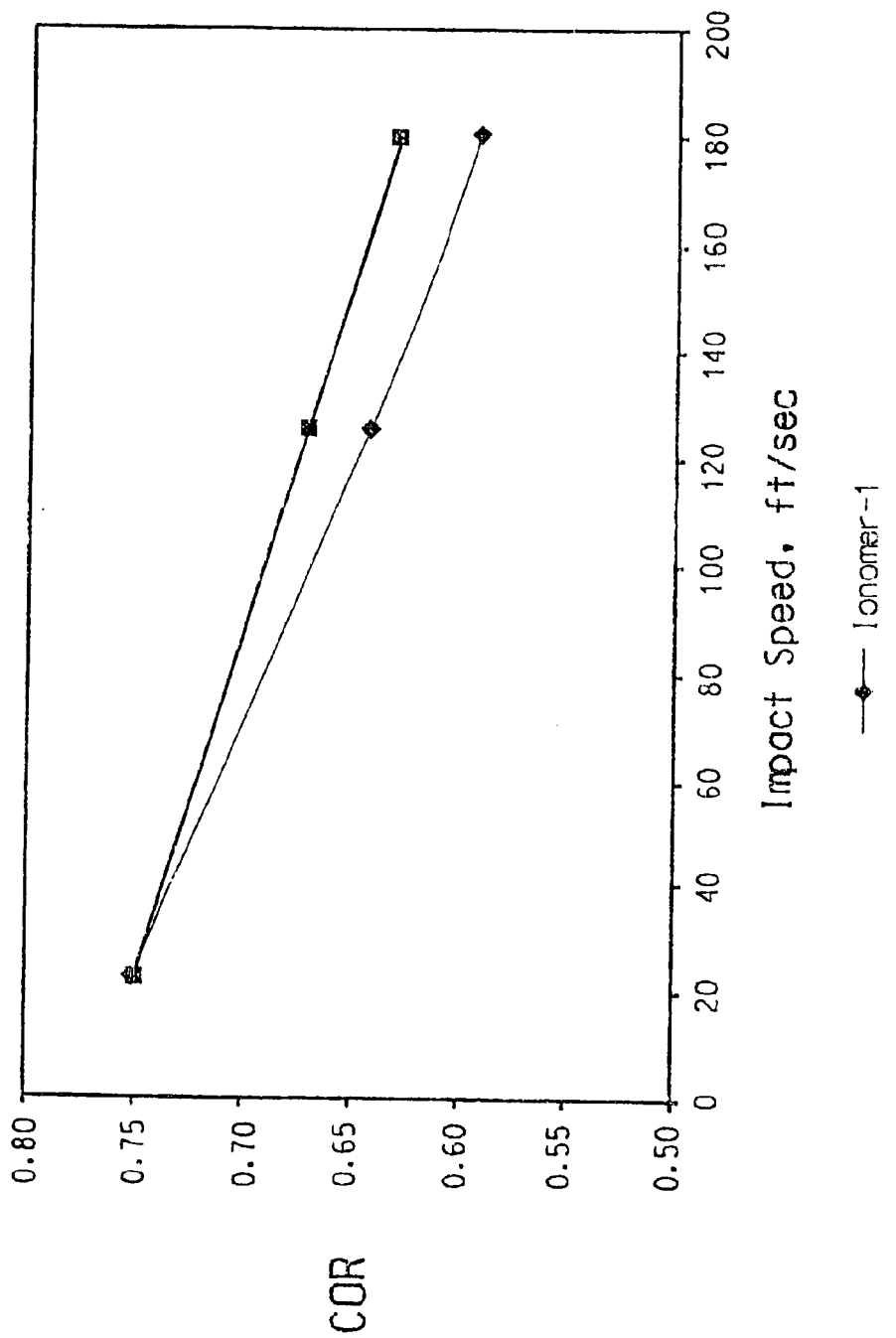

All references disclosed herein are incorporated by reference.

"Copolymer" means polymers containing two or more different monomers. The terms "bipolymer" and "terpolymer" mean polymers containing only two and three different monomers respectively. The phrase "copolymer of various monomers" means a copolymer whose units are derived from the various monomers.

"Low copolymer" is used herein to differentiate the lower Mw materials, those with Mw of about 2,000 to about 30,000, from the higher Mw high copolymers, those with Mw of about 80,000 to about 500,000.

"High copolymer" is used herein to differentiate the higher Mw materials, those with Mw of about 80,000 to about 500,000, from the lower Mw low copolymers, those with Mw of about 2,000 to about 30,000.

"Mw" means weight average molecular weight. "Mn" means number average molecular weight.

"Bi-Modal Blends" means blends of high copolymers and low copolymers wherein the Mw of the high copolymer and the Mw of the low copolymer are sufficiently different that two distinct molecular weight peaks can be observed when measuring Mw of the blend by GPC with high resolution column.

"Ethylene (meth) acrylic acid" means ethylene acrylic acid and/or ethylene methacrylic acid. Thus, the shorthand notation "E/(M)AA" used to identify, describe and/or claim a copolymer means ethylene acrylic acid and/or ethylene methacrylic acid copolymer wherein "(M)" denotes "(meth)" and "AA" denotes "acrylic acid".

According to the present invention, ethylene $\alpha,\beta$ ethylenically unsaturated $C_{3-8}$ carboxylic acid high copolymers, particularly ethylene (meth)acrylic acid bipolymers and ethylene, alkyl (meth)acrylate, (meth)acrylic acid terpolymers, having molecular weights of about 80,000 to about 500,000 are melt blended with ethylene $\alpha,\beta$ ethylenically unsaturated $C_{3-8}$ carboxylic acid low copolymers, particularly ethylene (meth)acrylic acid low copolymers (more particularly the bipolymers), of about 2,000 to about 30,000 by methods well known in the art.

Preferably the Mw of the high copolymers is separated from the Mw of the low copolymers sufficiently that the peaks for the high copolymers are distinctly separated from the peaks for the low copolymers when the blend molecular weight distribution is determined by GPC with high resolution column. Preferably, high copolymers with lower Mw's are blended with low copolymers with lower Mw's (e.g. high copolymers with Mw of 80,000 with low copolymers with Mw of 2,000). This becomes less important as the Mw's of the high copolymers increase.

Preferably the low copolymers are present in the range of about 5 to about 50 weight percent based on the total weight of the high copolymers and the low copolymers in the blend.

Preferably the high copolymers and low copolymers are partially or fully neutralized by alkali metal or alkyline earth metal cations. Preferably, about 40 to about 100%, alternatively about 50 to about 85%, alternatively about 50 to about 90%, alternatively about 60 to about 80% of the acid moieties in the high copolymers and low copolymers are neutralized. Cations are lithium*, sodium*, potassium, magnesium*, calcium, barium, lead, tin, or zinc* (*=preferred), or a combination of such cations.

Neutralization can be effected by first making an ionomer of the high copolymer and/or of the low copolymer and then melt-blending them. To achieve desired higher or full neutralization the resulting blend of ionomers can be further neutralized. Preferably the high copolymers and low copolymers are melt-blended and then neutralized in situ. In this case desired higher or full neutralization can be achieved in one step.

Optionally, the composition may contain up to 100 parts by weight of organic acid salts, up to 200 parts by weight thermoplastic elastomers, up to 170 parts by weight fillers based on 100 parts by weight of the "bi-modal" ionomer of the high copolymer/low copolymer blend. Other additives such as stabilizers and processing aids can be included.

The components of the blends of the present invention are more fully described below.

High Copolymers

The high copolymers of this invention are preferably 'direct' acid copolymers (as opposed to grafted copolymers) having an Mw of about 80,000 to about 500,000. Preferably they have polydispersities (Mw/Mn) of about 1 to about 15.

They are preferably alpha olefin, particularly ethylene, /$C_{3-8}$ $\alpha,\beta$ ethylenically unsaturated carboxylic acid, particularly acrylic and methacrylic acid, copolymers. They may optionally contain a third softening monomer. By "softening", it is meant that the polymer is made less crystalline. Suitable "softening" comonomers are monomers selected from alkyl acrylate and alkyl methacrylate, wherein the alkyl groups have from 1–12 carbon atoms, and vinyl acetate.

The ethylene acid copolymers can be described as an E/X/Y copolymers where E is ethylene, X is the $\alpha,\beta$ ethylenically unsaturated carboxylic acid, and Y is a softening comonomer. X is preferably present in 2–30 (preferably 5–25, most preferably 8–20) wt. % of the polymer, and Y is preferably present in 0–35 (alternatively 3–25 or 10–25) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674 which is incorporated herein by reference or by employing somewhat higher pressures than those at which copolymers with lower acid can be prepared.

Specific acid-copolymers include ethylene/(meth) acrylic acid bipolymers. They also include ethylene/(meth) acrylic acid/n-butyl (meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

Examples of high copolymers and their molecular weights are shown in the following table.

| Composition/MI | Mn ($10^3$) | Mw ($10^3$) | Polydispersity (Mw/Mn) |
|---|---|---|---|
| E/23.5nBA/9MAA/25MI | 26.6 | 176.5 | 6.6 |
| E/15MAA/60MI | 17.6 | 112.4 | 6.4 |
| E/4MAA/3MI | 31.7 | 365.5 | 11.5 |
| E/5.8AA/1.5MI | 31.5 | 162.1 | 5.1 |
| E/9AA/10MI | 24.3 | 186.4 | 7.7 |
| E/10MAA/500MI | 16.0 | 84.0 | 5.3 |
| E/10MAA/35MI | 19.6 | 160.8 | 8.2 |

Low Copolymers

The low copolymers of this invention are preferably 'direct' acid copolymers having an Mw of about 2,000 to about 30,000. Preferably they have polydispersities (Mw/Mn) of about 1 to about 10. They are preferably alpha olefin, particularly ethylene, /$C_{3-8}$ $\alpha,\beta$ ethylenically unsaturated carboxylic acid, particularly acrylic and methacrylic acid, copolymers. Preferably the acid moiety in these copolymers is about 3 to about 25 (preferably 5–15, most preferably 5–10) wt. % of the polymer.

Often these low copolymers are referred to as acid copolymer waxes available from Allied Signal (e.g., Allied wax AC143 believed to be an ethylene/16–18% acrylic acid copolymer with a number average molecular weight of 2,040, and others indicated in the following table with their molecular weights).

| | Composition/MI | Mn ($10^3$) | Mw ($10^3$) | Polydispersity (Mw/Mn) |
|---|---|---|---|---|
| AC540 | E/5AA/575 cps Brookfield @ 140 C.** | 4.3 | 7.5 | 1.7 |
| AC580 | E/10AA/650 cps Brookfield @ 140 C.** | 4.8 | 26.0 | 5.4 |

-continued

| Composition/MI | | Mn (10³) | Mw (10³) | Polydispersity (Mw/Mn) |
|---|---|---|---|---|
| AC5120 | E/15AA/650 cps Brookfield @ 140 C.** | 3.0 | 5.2 | 1.7 |

**No MI data available; Brookfield data defined by Honeywell or formally Allied Signal Ionomers Ionomers of the high copolymers and of the low copolymers when made separately can be made by methods well known in the art. The degree of neutralization and the acid level should be selected so that the resulting ionomers of the high copolymers and the ionomers of the low copolymers remain melt processable.

The bi-modal ionomers of high copolymer/low copolymer blends can be made by melt blending the melt processible ionomers separately made and then optionally further neutralizing with same or different cations to achieve desired higher or full neutralization of the resulting blend of ionomers. Preferably the non-neutralized high copolymers and low copolymers are melt-blended and then neutralized in situ. In this case desired higher or full neutralization can be achieved in one step.

In either case, the neutralization can be effected by alkali metal or alkaline earth metal cations. Such cations are lithium*, sodium*, potassium, magnesium*, calcium, barium, lead, tin, or zinc* (*=preferred), or a combination of such cations. Preferably the acid moieties in the resulting bi-modal ionomer of the high copolymers and low copolymers are partially or fully neutralized to a level of about 40 to about 100%, alternatively about 50 to about 85%, alternatively about 50 to about 90%, alternatively about 60 to about 80%.

Organic Acid Salts

The salt of organic acid of the present invention comprises the salts, particularly the barium, lithium, sodium, zinc, bismuth, chromium, cobalt, copper, potassium, strontium, titanium, tungsten, magnesium or calcium salts, of fatty acids, particularly stearic, behenic, erucic, oleic, linoleic, Preferably, the fatty acid salt is selected to have the lowest volatility. It is chosen so as to maximize COR while minimizing stiffness or compression, which has often been called "PGA Compression" in the golf ball art.

Thermoplastic Elastomers

The thermoplastic polymer component of the invention is selected from copolyetheresters, copolyetheramides, elastomeric polyolefins, styrene diene block copolymers and thermoplastic polyurethanes, these classes of polymers being well known in the art.

The copolyetheresters are discussed in detail in patents such as U.S. Pat. Nos. 3,651,014; 3,766,146; and 3,763,109. They are comprised of a multiplicity of recurring long chain units and short chain units joined head-to-tail through ester linkages, the long chain units being represented by the formula

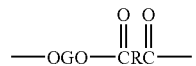

and the short chain units being represented by the formula

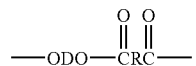

where G is a divalent radical remaining after the removal of terminal hydroxyl groups from a poly (alkylene oxide) glycol having a molecular weight of about 400–6,000 and a carbon to oxygen ratio of about 2.0–4.3; R is a divalent radical remaining after removal of carboxyl groups from a dicarboxylic acid having a molecular weight less than about 300; and D is a divalent radical remaining after removal of hydroxyl groups from a diol having a molecular weight less than about 250; provided said short chain ester units amount to about 15–95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. Of course, the more polyether units incorporated into the copolyetherester, the softer the polymer. For purposes of the invention, the molar ether:ester ratio can vary from 90:10 to 10:90, preferably 80:20 to 60:40; and the shore D hardness is less than 70, preferably less than about 40.

The copolyetheramides are also well known in the art as described in U.S. Pat. No. 4,331,786, for example. They are comprised of a linear and regular chain of rigid polyamide segments and flexible polyether segments, as represented by the general formula

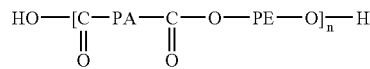

wherein PA is a linear saturated aliphatic polyamide sequence formed from a lactam or amino acid having a hydrocarbon chain containing 4 to 14 carbon atoms or from an aliphatic $C_6$–$C_9$ diamine, in the presence of a chain-limiting aliphatic carboxylic diacid having 4–20 carbon atoms; said polyamide having an average molecular weight between 300 and 15,000; and PE is a polyoxyalkylene sequence formed from linear or branched aliphatic polyoxyalkylene glycols, mixtures thereof or copolyethers derived therefrom said polyoxyalkylene glycols having a molecular weight of less than or equal to 6,000 and n indicates a sufficient number of repeating units so that said polyetheramide copolymer has an intrinsic viscosity of from about 0.8 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetra-alkyl ortho-titinate having the general formula $Ti(OR)_4$, wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the shore D hardness.

The elastomeric polyolefins are polymers composed of ethylene and higher primary olefins such as propylene, hexene, octene and optionally 1,4-hexadiene and or ethylidene norbornene or norbornadiene. The elastomeric polyolefins can be functionalized with maleic anhydride.

Thermoplastic polyurethanes are linear or slightly chain branched polymers consisting of hard blocks and soft elastomeric blocks. They are produced by reacting soft hydroxy terminated elastomeric polyethers or polyesters with diisocyanates such as methylene diisocyanate (MDI) or toluene diisocyanate(TDI). These polymers can be chain extended with glycols, diamines, diacids, or amino alcohols. The reaction products of the isocyanates and the alcohols are called urethanes and these blocks are relatively hard and high melting. These hard high melting blocks are responsible for the thermoplastic nature of the polyurethanes.

Block styrene diene copolymers are composed of polystyrene units and polydiene units. The polydiene units are derived from polybutadiene, polyisoprene units or copolymers of these two. In the case of the copolymer it is possible to hydrogenate the polyolefin to give saturated rubbery backbone segments. These materials are usually referred to as SBS, SIS or SEBS thermoplastic elastomers and they can also be functionalized with maleic anhydride.

Fillers

The optional filler component of the subject invention is chosen to impart additional density to the bi-modal ionomers or blends of them with other materials. Preferred densities depend on the application. In golf balls, they will include densities in the range starting with the density of unfilled polymer to 1.8 gm/cc. Generally, the filler will be inorganic having a density greater than about 4 gm/cc, preferably greater than 5 gm/cc, and will be present in amounts between 0 and about 60 wt. % based on the total weight of the composition. Examples of useful fillers include zinc oxide, barium sulfate, lead silicate and tungsten carbide, tin oxide, as well as the other well known corresponding salts and oxides thereof. It is preferred that the filler materials be non-reactive or almost non-reactive with the polymer components described above when the ionomers are less than completely neutralized. If the ionomers are fully neutralized, reactive fillers may be used. Zinc Oxide grades, such as Zinc Oxide, grade XX503R available from Zinc Corporation of America, that do not react with any free acid to cause cross-linking and a drop in MI are preferred, particularly when the ionomer is not fully neutralized.

Other Components

Other optional additives include titanium dioxide which is used as a whitening agent or filler; other pigments, optical brighteners; surfactants; processing aids; etc.

Uses of Composition in Golf Balls

The bi-modal ionomers of this invention are useful in combination with other materials in specific combinations which, in large part, will be dependent upon the application. The bi-modal ionomers may be substituted for one or more materials taught in the art at the levels taught in the art for use in covers, cores, centers, intermediate layers in multi-layered golf balls, or one-piece golf balls. Sufficient fillers can be added to one or more components of the golf ball to adjust the weight of the golf ball to a level meeting the limits set by the golfer's governing authority. See, for example, U.S. Pat. Nos. 4,274,637; 4,264,075; 4,323,247; 4,337,947; 4,398,000; 4,526,375; 4,567,219; 4,674,751; 4,884,814; 4,911,451; 4,984,804; 4,986,545; 5,000,459; 5,068,151; 5,098,105; 5,120,791; 5,155,157; 5,197,740; 5,222,739; 5,253,871; 5,298,571; 5,321,089; 5,328,959; 5,330,837; 5,338,038; 5,338,610; 5,359,000; 5,368,304; 5,810,678; 5,971,870; 5,971,871; 5,971,872; 5,973,046; 5,810,678; 5,873,796; 5,757,483; 5,567,772; 5,976,443; 6,018,003; 6,096,830; and WO 99/48569.

Three-Piece Golf Ball

As used herein, the term "three-piece ball" refers to a golf ball comprising a center, a traditional elastomeric winding wound around the center, and a cover made from any traditional golf ball cover material such as Surlyn® ionomer resin, balata rubber or thermoset/thermoplastic polyurethanes and the like. These three-piece golf balls are manufactured by well known techniques as described in U.S. Pat. No. 4,846,910 for example. The bi-modal ionomer may be used in the cover or the center of such balls in combination with other materials typically used in these components.

Two-Piece Golf Ball

As used herein, the term "two-piece ball" refers to a golf ball comprising a core and a cover made from any traditional golf ball cover material as discussed above. These two-piece balls are manufactured by first molding the core from a thermoset or thermoplastic composition, positioning these preformed cores in injection molding cavities using retractable pins, then injection molding the cover material around the cores. Alternatively, covers can be produced by compression molding cover material over the cores. The bi-modal ionomer may be used in the cover or the core of such balls alone or in combination with other materials typically used in these components.

Multi-Layer Golf Ball

As used herein, the term "multi-layer ball" refers to a golf ball comprising a core, a cover made from any traditional golf ball cover material, and one or more mantles between the core and the cover. These multi-layer balls are manufactured by first molding or making the core, typically compression or injection molding a mantle over the core and then compression or injection molding a cover over the mantle. The bi-modal ionomer may be used in the cover, the one or more mantles or the core of such balls alone or in combination with other materials typically used in these components.

One-Piece Golf Ball

As used herein, the term "one-piece ball" refers to a golf ball molded in toto from a thermoplastic composition, i.e., not having elastomeric windings nor a cover. The one-piece molded ball will have a traditional dimple pattern and may be coated with a urethane lacquer or be painted for appearance purposes, but such a coating and/or painting will not affect the performance characteristics of the ball. These one-piece balls are manufactured by direct injection molding techniques or by compression molding techniques. The bi-modal ionomer may be used in such balls in combination with other materials typically used in these balls.

EXAMPLES AND COMPARATIVE EXAMPLES

The resins used in the examples were as follows:

| | Composition/MI | Mn* (E3) | Mw* (E3) | Polydispersity* (Mw/Mn) |
|---|---|---|---|---|
| AC540 | E/5AA/500 cps Brookfield @ 140 C.** | 4.3 | 7.5 | 1.7 |
| AC580 | E/10AA/650 cps Brookfield @ 140 C.** | 4.8 | 26.0 | 5.4 |
| AC5120 | E/15AA/650 cps Brookfield @ 140 C.** | 3.0 | 5.2 | 1.7 |
| HCP 1 | E/23.5nBA/9MAA/25MI | 26.6 | 176.5 | 6.6 |
| HCP 2 | E/8.3AA/17nBA | | | |
| Ionomer-1 | E/23.5nBA/9MAA, 51% Mg neutralized/1.1MI | | | |
| Ionomer-2 | E/19MAA, 37% Na neutralized/2.6MI | | | |
| Ionomer-3 | E/11MAA, 37% Na neutralized/10MI | | | |
| Ionomer-4 | E/11MAA, 57% Zn neutralized/5.2MI | | | |
| Ionomer-5 | E/15MAA, 53% Zn neutralized/5.0MI | | | |
| Ionomer-6 | E/15MAA, 51% Na neutralized/4.5MI | | | |

*MW and MWD Comparison (by GPC)
**No MI data available

Examples 1–6

Blends of E/9MAA/23.5nBA (HCP 1) and E/10AA (AC580) at 90:10 (Example 1) and 80:20 (Example 2) ratios were neutralized on a single screw extruder with a Mg(OH)$_2$ concentrate into bi-modal ionomers with the level of neutralization indicated in the following table. The ionomers of Example 1 and Example 2 together with reference Ionomer-1 (Comparative Example 3) were injection molded into spheres and tested for the golf ball properties. Improved COR's are measured for the bi-modal ionomers over the reference. When bi-modal ionomer of Example 1 was further modified with Magnesium Stearate, dramatic property enhancements were achieved (Examples 4, 5 and 6).

|  | Ex. 1 | Ex. 2 | Comp. Ex. 3 |
| --- | --- | --- | --- |
| E/MAA/nBA, wt % | 90 | 80 | 100 |
| E/AA, wt % | 10 | 20 | 0 |
| Nominal Neut., % | 70 | 75 | 51 |
| MI at 190° C. | 1 | 1 | 1.1 |
| PGA compression | 86 | 90 | 58 |
| Drop Rebound, % | 59.8 | 56.3 | 56.6 |
| COR-125 | 0.671 | 0.670 | 0.644 |
| COR-180 | 0.628 | 0.628 | 0.596 |

|  | Ex. 4 | Ex. 5 | Ex. 6 |
| --- | --- | --- | --- |
| Ex. 1 Bi-modal ionomer, wt. % | 85 | 70 | 60 |
| MgSt., w % | 15 | 30 | 40 |
| MI at 190° C. | 1.5 | 1.6 | 2.5 |
| PGA compression | 85 | 83 | 91 |
| Drop Rebound, % | 68.3 | 75.2 | 77.1 |
| COR-125 | 0.728 | 0.761 | 0.773 |
| COR-180 | 0.678 | 0.703 | 0.718 |

Examples 7–12

A pellet blend of 90 wt. % Ionomer-2 and 10 wt. % E/15AA (AC5120) was melt blended and neutralized in the presence of a specific amount of $Na_2CO_3$ concentrate to a nominal neutralization level of 60% in a twin screw extruder to achieve the bi-modal ionomer (BMI-2). A pellet blend of 90 wt. % Ionomer-1 and 10 wt. % E/10AA (AC580) was melt blended and neutralized in the presence of a specific amount of $Mg(OH)_2$ concentrate to a nominal neutralization level of 70% in a twin screw extruder to achieve the bi-modal ionomer (BMI-1). Ionomer blends were then prepared by melt blending on a twin screw extruder at 50:50 ratio the bi-modal ionomers, i.e. BMI-2, BMI-1 and the conventional ionomers, i.e. Ionomer-2 and Ionomer-1. The base ionomers and blends depicted in the table were injection molded into spheres and tested for the golf ball properties. The resilience enhancement of the blends containing the bi-modal ionomers was clearly illustrated.

Examples 13–18

Bimodal ionomers based on Na and Zn ionomers containing 11% MAA, i.e. Ionomer-3 and Ionomer-4, and E/10AA at 90:10 ratio were prepared on the twin screw extruder under the blending/neutralization conditions similar to the above examples using a $Na_2CO_3$ concentrate or a ZnO concentrate. The base ionomers and the bi-modal ionomers were injection molded into spheres and tested for the golf ball properties. The bi-modal ionomers and their blends showed lower PGA compression and improved COR.

|  | Ex. 13 | Ex. 14 | Comp. Ex. 15 | Comp. Ex. 16 | Ex. 17 | Comp. Ex. 18 |
| --- | --- | --- | --- | --- | --- | --- |
| BMI-3 | 100 |  |  |  | 50 |  |
| BMI-4 |  | 100 |  |  | 50 |  |
| Ionomer-3 |  |  | 100 |  |  | 50 |
| Ionomer-4 |  |  |  | 100 |  | 50 |
| Nominal Neut, % | 75 | 75 | 37 | 57 | 75 | 47 |
| MI | 1 | 2 | 10 | 5 | 1.8 | NA |
| PGA Comp. | 130 | 134 | 146 | 139 | 134 | 146 |
| Drop Rebound, % | 67.7 | 59 | 64.5 | 60.4 | 66.3 | 66.7 |
| COR-125 | 0.702 | 0.621 | 0.649 | 0.615 | 0.691 | 0.669 |
| COR-180 | 0.660 | 0.580 | 0.601 | 0.569 | 0.651 | 0.622 |

Examples 19–22

Blend of E/8.3AA/17nBA (HCP 2) and E/10AA (AC580) at 90:10 weight ratio was neutralized on a single screw extruder with a $Mg(OH)_2$ concentrate into a bi-modal ionomer with 2MI and a nominal neutralization level of 63% (Examples 20). A reference (Comparative Example 19) was also prepared under the similar conditions to a nominal neutralization level of 53% with HCP 2 alone. The ionomers are injection molded into spheres and tested for the golf ball properties. Improved COR's are measured for the bi-modal ionomers over the reference. When bi-modal ionomers of Example 20 were further modified with MgSt. (Examples 21 and 22) dramatic property enhancements were achieved.

|  | Ex. 7 | Ex. 8 | Ex. 9 | Comp. Ex. 10 | Ex. 11 | Comp. Ex. 3 | Comp. Ex. 12 |
| --- | --- | --- | --- | --- | --- | --- | --- |
| BMI-2, wt % | 50 | 50 | — | — | 100 |  | — |
| BMI-1, wt % | 50 | — | 50 | — | — |  | — |
| Ionomer-2 | — | — | 50 | 50 | — |  | 100 |
| Ionomer-1 | — | 50 | — | 50 | — | 100 | — |
| MI | 0.6 | 0.6 | NA | NA | 0.6 | 1.1 | 2.0 |
|  |  |  | Neat Sphere Property |  |  |  |  |
| PGA compression | 130 | 125 | 132 | 126 | 150 | 58 | 158 |
| Drop Rebound, % | 67.3 | 66.7 | 66.7 | 64.6 | 76 | 56.6 | 80.3 |
| COR-125 | 0.707 | 0.697 | 0.689 | 0.671 | 0.740 | 0.644 | 0.750 |
| COR-180 | 0.659 | 0.651 | 0.640 | 0.621 | 0.692 | 0.596 | 0.693 |

|  | Comp. Ex. 19 | Ex. 20 | Ex. 21 | Ex. 22 |
|---|---|---|---|---|
| MgSt. Mod., w % | 0 | 0 | 15 | 40 |
| MI | 2 | 2 | 1.9 | 1.3 |
| PGA Comp. | 108 | 111 | 108 | 108 |
| Drop Rebound, % | 60.9 | 61.9 | 69.2 | 79.4 |
| COR-125 | 0.673 | 0.676 | 0.728 | 0.794 |
| COR-180 | 0.631 | 0.636 | 0.686 | 0.745 |

Examples 23–29

Bi-modal ionomers of this invention achieve performance improvement over the conventional base ionomer references in the relative relationship between resilience and impact speed, i.e. high relative resilience at high impact speed and lower relative resilience at low impact speed when compared with conventional ionomer counterparts. This performance combination is highly desirable in the golf ball application to enable greater driving distance and better putting control.

|  |  | COR Difference between BM Surlyn and Ref. Surlyn | | |
|---|---|---|---|---|
| Example |  | 23 ft/s | 125 ft/s | 180 ft/s |
| 23 | BMI-3 - Ionomer-3 | 0.020 | 0.053 | 0.059 |
| 24 | BMI-4 - Ionomer-4 | −0.009 | 0.006 | 0.011 |
| 25 | BMI-5*** - Ionomer-5 | −0.008 | 0.016 | 0.023 |
| 26 | BMI-6**** - Ionomer-6 | −0.022 | −0.010 | 0.001 |
| 27 | BMI-2 - Ionomer-2 | −0.024 | −0.010 | −0.001 |
| 28 | BMI-1/20* - Ionomer-1 | −0.002 | 0.026 | 0.032 |
| 29 | BMI-1/10** - Ionomer-1 | 0.021 | 0.027 | 0.032 |

*BMI-1/20: 80:20 blend of ionomer of HCP 1 and E/10AA (AC580) and further neutralized with Mg.
**BMI-1/10: 90:10 blend of ionomer of HCP 1 and E/10AA (AC580) and further neutralized with Mg.
***BMI-5: Blend of ionomer-5 and E/15AA (AC5120) at 90:10 by weight and further neutralized with Zn.
****BMI-6: Blend of ionomer-6 and E/15AA (AC5120) at 90:10 by weight and further neutralized with Na.

FIGS. 1 through 6 are plots of coefficient of restitution versus impact speed for the individual bi-modal ionomers and the base ionomers used in Examples 23 through 28, respectively. The impact speed of 23 feet/second was achieved by a drop rebound test (dropping sphere from a height of 100 inches onto a hard, rigid surface such as a thick steel plate or a stone block). The COR was then calculated from the impact velocities based on the drop height and the rebound height measured. COR's at 125 and 180 feet/second speeds were measured by firing the sphere from an air cannon at a velocity determined by the air pressure. The outbound velocity generally employed is between 125 to 180 feet/second. The ball strikes a steel plate positioned three feet away from the point where outbound velocity is determined, and rebounds through a speed-monitoring device. The return velocity divided by the outbound velocity is the COR.

Figure 7:
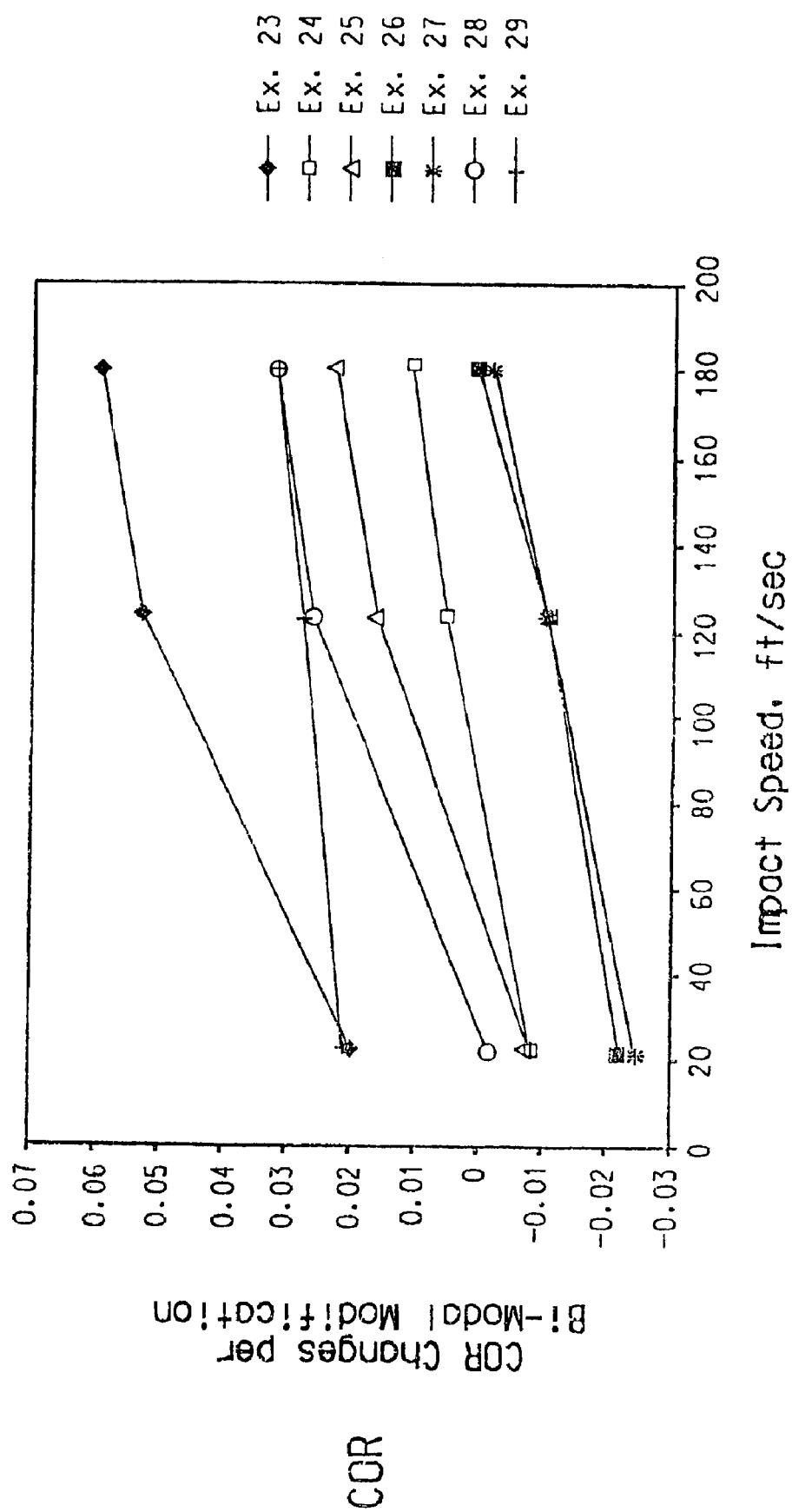
FIG. 7 is a plot of the data from Examples 23 though 29 depicting the differences in COR at the three velocities determined by subtracting the COR of the base ionomer from the COR of the bi-modal ionomer in each case.

FIG. 7 is a plot of the data in the table. It is a plot of the differences in COR at the three velocities determined by subtracting the COR of the base ionomer from the COR of the bi-modal ionomer in each case.

Figure 8:
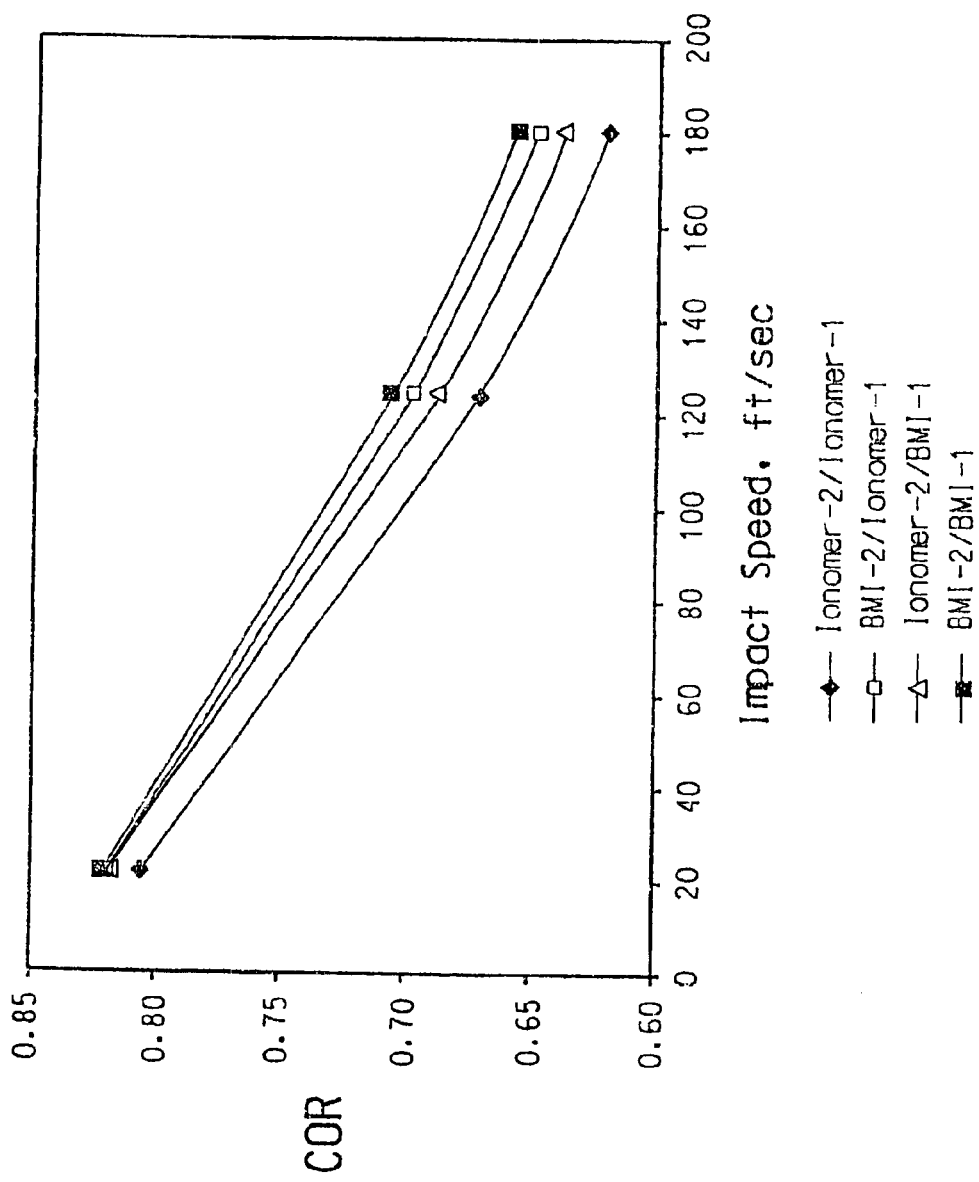
FIG. 8 is a plot of resilience versus impact speed of neat spheres based on blends with or without the bi-modal ionomers.

FIG. 8 is a plot of resilience versus impact speed of neat spheres based on blends with or without the bi-modal ionomers. The bi-modal stiff ionomer and blends property characterization is provided in the following table.

| Bi-modal Stiff Ionomer and Blends Property Characterization | | | | | | |
|---|---|---|---|---|---|---|
| Ionomer-2 | 100 |  | 50 |  | 50 |  |
| Ionomer-1 |  |  | 50 | 50 |  |  |
| BMI-2 |  | 100 |  | 50 |  | 50 |
| BMI-1 |  |  |  |  | 50 | 50 |
| MI, g/10 min | 2 | 0.6 | NA | 0.6 | NA | 0.6 |
| Neat Sphere Property | | | | | | |
| PGA Compression | 158 | 150 | 126 | 125 | 132 | 130 |
| Drop Rebound, % | 80.3 | 76 | 64.6 | 66.7 | 66.7 | 67.3 |
| COR-23 (Calc) | 0.896 | 0.872 | 0.804 | 0.817 | 0.817 | 0.820 |
| COR-125 | 0.75 | 0.74 | 0.671 | 0.697 | 0.689 | 0.707 |
| COR-180 | 0.693 | 0.792 | 0.621 | 0.651 | 0.64 | 0.659 |

Figure 9:
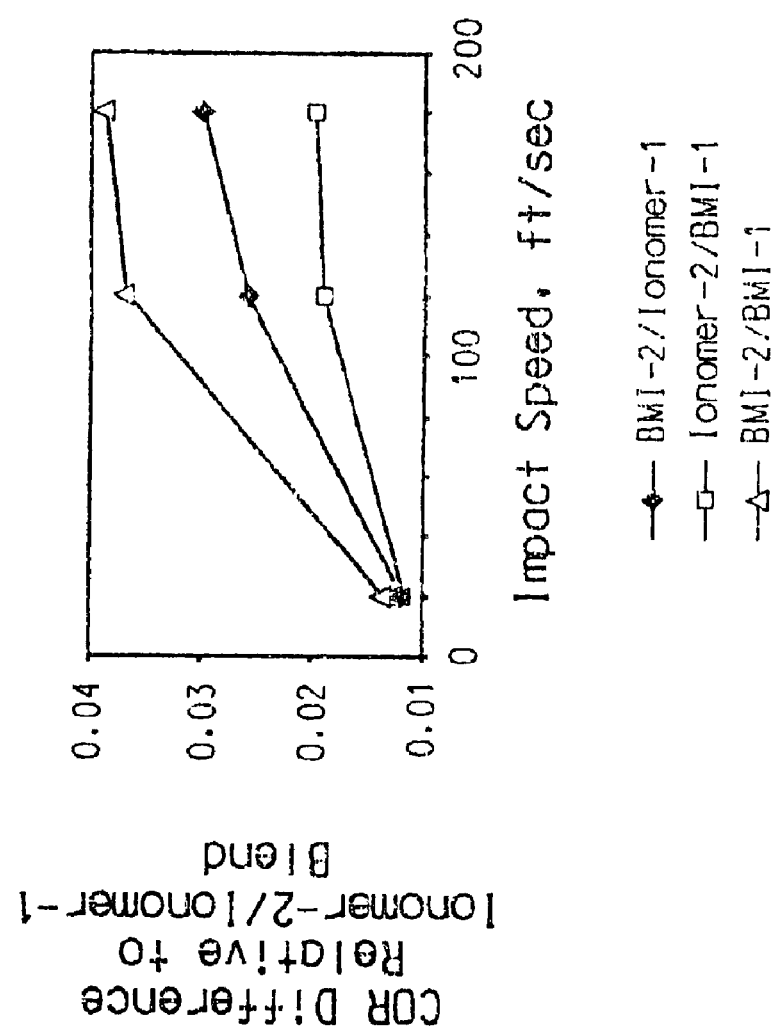
FIG. 9 is a plot of the relative COR differences at different impact velocities between the bi-modal ionomer, i.e. BMI-1 or BMI-2, containing blends and the reference ionomer blend, i.e.ionomer-1/ionomer-2 (50:50 by weight).

FIG. 9 is a plot of the relative COR differences at different impact velocities between the bi-modal ionomer, i.e. BMI-1 or BMI-2, containing blends and the reference ionomer blend, i.e. ionomer-1/ionomer-2 (50:50 by weight). While the bi-modal ionomer containing blends exhibit higher COR at higher impact velocities, they exhibit comparable COR at 23 ft/second to allow good putting control, in combination with long drive distance.

|  | 23 ft/sec | 125 ft/sec | 180 ft/sec |
|---|---|---|---|
| | COR at Different Impact Speeds | | |
| Ionomer-2/Ionomer-1 | 0.804 | 0.671 | 0.621 |
| BMI-2/Ionomer-1 | 0.817 | 0.697 | 0.651 |
| Ionomer-2/BMI-1 | 0.817 | 0.689 | 0.64 |
| BMI-2/BMI-1 | 0.82 | 0.707 | 0.659 |
| | COR Difference Relative to Ionomer-2/Ionomer-1 Blend | | |
| BMI-2/Ionomer-1 | 0.013 | 0.026 | 0.03 |
| Ionomer-2/BMI-1 | 0.013 | 0.018 | 0.019 |
| BMI-2/BMI-1 | 0.016 | 0.036 | 0.038 |

Examples 30 to 33

Bi-modal ionomers of this invention achieve performance improvement over the conventional base ionomer references in the heat stability, as measured by the resistance to deformation at the elevated temperature and under stress. E/9MAA/23.5nBA (HCP 1) was partially neutralized (about 51%) with $Mg(OH)_2$ concentrate on a single screw extruder and was subsequently blended with E/5AA (AC540) at 90:10 (Example 30) and 85:15 (Example 31) ratios and further neutralized with $Mg(OH)_2$ concentrate to maintain approximately 51% neutralization.

E/9MAA/23.5nBA (HPC 1) was also partially neutralized (about 51%) with ZnO concentrate on a single screw extruder and subsequently blended with E/5AA (AC540) at 90:10 (Example 32) and 85:15 (Example 33) ratios.

The bi-modal ionomers consistently demonstrated lower deformations than the conventional base ionomer references after subjecting to 70° C. and 1 Newton force for 1400 minutes reflecting enhanced resistance to heat induced deformation, i.e. heat stability. This performance enhancement is highly desirable in the golf ball application to enable ball stability when stored in hot environment under load.

| | Ex. 1 | Ex. 30 | Ex. 31 | Comp. Ex. 3 | Ex. 32 | Ex. 33 | Comp. Ex. 34** |
|---|---|---|---|---|---|---|---|
| MI | 1 | 1.8 | 2.7 | 0.95 | 0.48 | 0.77 | 0.28 |
| % Deform.* | 17.3 | 10.2 | 9.9 | 22.1 | 15 | | 9.7 | 20.6 |

*Deformation = % Height Change under 1 Newton/70° C. for 1400 minutes.
**Resin used in Comp. Ex. 34: E/9MAA/23.5nBA/25MI about 51% neutralized with ZnO.

What is claimed is:

1. A cover of a golf ball comprising a bi-modal composition comprising a thermoplastic composition that is melt processible consisting essentially of
    (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer;
    (b) 5–50 wt. % based on (a)+(b) of one or more E/(M)AA copolymers having 3–25 wt. % (M)AA or salts thereof, wherein the E/X/Y copolymers have an Mw in the range of 80,000 to 500,000, and the E/(M)AA copolymers have an Mw between 2,000 and 30,000; and
    (c) 5–50 wt. % based on (a)+(b) of one or more aliphatic, mono-functional organic acids having fewer than 30 carbon atoms or salt thereof, wherein greater than 80% of all the acid of (a) and of (b) and of (c) is neutralized; wherein sufficient filler is added (to one or more components of the golf ball) to adjust the weight of the golf ball to a level meeting the limits set by the golfer's governing authority.

2. An intermediate layer in a multi-layer golf ball comprising a bi-modal composition comprising a thermoplastic composition that is melt processible consisting essentially of
    (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer;
    (b) 5–50 wt. % based on (a)+(b) of one or more E/(M)AA copolymers having 3–25 wt. % (M)AA or salts thereof, wherein the E/X/Y copolymers have an Mw in the range of 80,000 to 500,000, and the E/(M)AA copolymers have an Mw between 2,000 and 30,000;
    (c) 5–50 wt. % based on (a)+(b) of one or more aliphatic, mono-functional organic acids having fewer than 30 carbon atoms or salt thereof, wherein greater than 80% of all the acid of (a) and of (b) and of (c) is neutralized; and, optionally,
    (d) 1–30 wt. % based on the total weight of the bimodal composition of thermoplastic elastomeric resin selected from copolyetheramides, copolyetheresters, elastomeric polymerolefins, block polystyrene polydiene copolymers, and thermoplastic urethanes;
    wherein sufficient filler is added (to one or more components of the golf ball) to adjust the weight of the golf ball to a level meeting the limits set by the golfer's governing authority.

3. A core or part of a core of a two- or multiple-piece golf ball or a center of a three-piece golf ball comprising a bi-modal composition comprising a thermoplastic composition that is melt processible consisting essentially of
    (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer;
    (b) 5–50 wt. % based on (a)+(b) of one or more E/(M)AA copolymers having 3–25 wt. % (M)AA or salts thereof, wherein the E/X/Y copolymers have an Mw in the range of 80,000 to 500,000, and the E/(M)AA copolymers have an Mw between 2,000 and 30,000;
    (c) 5–50 wt. % based on (a)+(b) of one or more aliphatic, mono-functional organic acids having fewer than 30 carbon atoms or salt thereof, wherein greater than 80% of all the acid of (a) and of (b) and of (c) is neutralized; and, optionally,
    (d) 1–30 wt. % based on the total weight of the bimodal composition of thermoplastic elastomeric resin selected from copolyetheramides, copolyetheresters, elastomeric polymerolefins, block polystyrene polydiene copolymers, and thermoplastic urethanes;
    wherein sufficient filler is added (to one or more components of the golf ball) to adjust the weight of the golf ball to a level meeting the limits set by the golfer's governing authority.

4. A one-piece golf ball comprising the a bi-modal composition comprising a thermoplastic composition that is melt processible consisting essentially of
    (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer;
    (b) 5–50 wt. % based on (a+(b) of one or more E/(M)AA copolymers having 3–25 wt. % (M)AA or salts thereof, wherein the E/X/Y copolymers have an Mw in the range of 80,000 to 500,000, and the E/(M)AA copolymers have an Mw between 2,000 and 30,000;
    (c) 5–50 wt. % based on (a)+(b) of one or more aliphatic, mono-functional organic acids having fewer than 30 carbon atoms or salt thereof, wherein greater than 80% of all the acid of (a) and of (b) and of (c) is neutralized; and, optionally,
    (d) 1–30 wt. % based on the total weight of the bimodal composition of thermoplastic elastomeric resin selected from copolyetheramides, copolyetheresters, elastomeric polymerolefins, block polystyrene polydiene copolymers, and thermoplastic urethanes;
    wherein sufficient filler is added to adjust the weight of the golf ball to a level meeting the limits set by the golfer's governing authority.

5. An intermediate layer in a multi-layer golf ball comprising the composition consisting essentially of (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer, and (b) 5–50 wt. % based on (a)+(b) of one or more E/(M)AA copolymers having 3–25 wt. % (M)AA or salts thereof, wherein greater than 80% of all the acid of (a) and of (b) is neutralized and wherein sufficient filler is added (to one or more components of the golf ball) to adjust the weight of the golf ball to a level meeting the limits set by the golfer's governing authority.

6. A core or part of a core of a two- or multiple-piece golf ball or a center of a three-piece golf ball comprising the composition consisting essentially of (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer, and (b) 5–50 wt. % based on (a)+(b) of one or more E/(M)AA copolymers having 3–25 wt. % (M)AA or salts thereof, wherein greater than 80% of all the acid of (a) and of (b) is neutralized, wherein sufficient filler is added (to one or more components of the golf ball) to adjust the weight of the golf ball to a level meeting the limits set by the golfer's governing authority.

7. A one-piece golf ball comprising the composition consisting essentially of (a) E/X/Y copolymers where E is ethylene, X is derived from a C3 to C8 α,β ethylenically unsaturated carboxylic acid, and Y is a softening comonomer selected from the group consisting of alkyl acrylates and alkyl methacrylates, wherein the alkyl groups have from 1–8 carbon atoms, or ionomers of the E/X/Y copolymers wherein X is about 2–30 wt. % of the E/X/Y copolymer, and Y is 0 to about 35 wt. % of the E/X/Y copolymer, and (b) 5–50 wt. % based on (a)+(b) of one or more E/(M)AA copolymers having 3–25 wt. % (M)AA or salts thereof, wherein greater than 80% of all the acid of (a) and of (b) is neutralized, and wherein sufficient filler is added to adjust the weight of the golf ball to a level meeting the limits set by the golfers governing authority.

* * * * *

UNITED STATES PATENT AND TRADEMARK OFFICE
CERTIFICATE OF CORRECTION

PATENT NO.         : 7,037,967 B2
APPLICATION NO. : 10/854725
DATED               : May 2, 2006
INVENTOR(S)       : Chen John Chu It is certified that error appears in the above-identified patent and that said Letters Patent is hereby corrected as shown below:

Column 14, line 35, A one-piece golf ball comprising [the] a bi-modal com-

Column 14, line 48, "on (a+(b) of" should read -- on (a)+(b) of --.

Column 16, line 22, "the golfers governing" should read -- the golfer's governing --.

Signed and Sealed this

Nineteenth Day of December, 2006

JON W. DUDAS
*Director of the United States Patent and Trademark Office*